United States Patent [19]

Bergström et al.

[11] Patent Number: 4,831,674
[45] Date of Patent: May 23, 1989

[54] DRILLING AND THREADING TOOL AND METHOD FOR DRILLING AND THREADING

[75] Inventors: Bert E. Bergström; Hans E. Lindberg, both of Sandviken, Sweden

[73] Assignee: Sandvik AB, Sandviken, Sweden

[21] Appl. No.: 152,477

[22] Filed: Feb. 5, 1988

[30] Foreign Application Priority Data

Feb. 10, 1987 [SE] Sweden .................................. 8700503

[51] Int. Cl.⁴ ................................................ B23G 5/20
[52] U.S. Cl. ................................ 10/140; 10/141 R; 408/222; 409/74
[58] Field of Search ........................ 409/65, 66, 74, 77; 408/218, 219, 220, 222; 10/140, 141 R

[56] References Cited

U.S. PATENT DOCUMENTS 4,651,374 3/1987 Turchan .................................. 10/140

Primary Examiner—Z. R. Bilinsky
Attorney, Agent, or Firm—Burns, Doane, Swecker & Mathis

[57] ABSTRACT

A combined drilling and threading tool comprises a shank having a conical front portion defined by hole-cutting edges, and spirally curved ribs disposed rearwardly of the edges. A row of thread-cutting teeth is disposed along the leading edge of each rib. Each tooth includes a thread-cutting edge facing in the direction of tool rotation, and a side surface extending away from the direction of rotation. The side surface is shaped to produce axial and radial clearance relative to the thread being cut. Each tooth terminates at a location intermediate the leading and trailing edges of its associated rib.

12 Claims, 4 Drawing Sheets

DRILLING AND THREADING TOOL AND METHOD FOR DRILLING AND THREADING

BACKGROUND AND OBJECTS OF THE INVENTION

The present invention relates to a combined drilling and threading tool including an elongated shank and a conical front portion arranged in its front end and provided with two cutting edges extending symmetrically from the center of the tool and symmetrically extending ribs which are provided with cutting teeth of mutually identical profiles and which are separated by symmetrically extending chip flutes. Furthermore the invention relates to a method for drilling and threading.

In order to conduct machining operations, such as drilling and thread milling, different types of tools have been commonly used which have been optimized for each machining. The drilling operation has been conducted by means of a tool such as a drill provided with hard metal inserts or a solid drill of hard metal or speed steel. In order to be able to cut an internal screw thread after drilling it is necessary to change tool in the machine. A tool, such as a tap or a boring bar, is mounted instead of the drill. In the latter case the boring bar has been provided with a radially projecting thread cutting insert at its front end which has a cutting edge having the thread profile corresponding to the thread to be machined in the work piece.

For reducing of costs in the work shops it is most desirable to use a combination tool which provides for several different operations in succession without downtime for tool exchange in the machine.

The objects of the present invention are to provide a combined drilling and threading tool of a new type which provides for drilling and threading with large feed and cutting speeds and that simultaneously provides for a favourable chip flow.

The tool is characterized in that an inner cutting edge portion extending radially inwards to the center of the tool has a contour different from the contour of a radially outer portion of the same cutting edge and in that a sufficient clearance surface and chip flow space are provided adjacent to said inner cutting edge portion and in that teeth are formed without pitch and with mutually identical axial spacing on the ribs, said ribs provided with teeth extending towards the front portion of the tool.

THE DRAWINGS

Other features characterizing the invention will be more closely described hereinafter in connection with the appended drawings showing a preferred embodiment of the invention.

FIGS. 6a–f show an axial section of a work piece which is drilled and threaded by a tool according to FIGS. 1-5, and FIGS. 7a–d show corresponding machining by means of an alternative tool according to the invention.

DESCRIPTION OF A PREFERRED EMBODIMENT OF THE INVENTION

Figure 1:
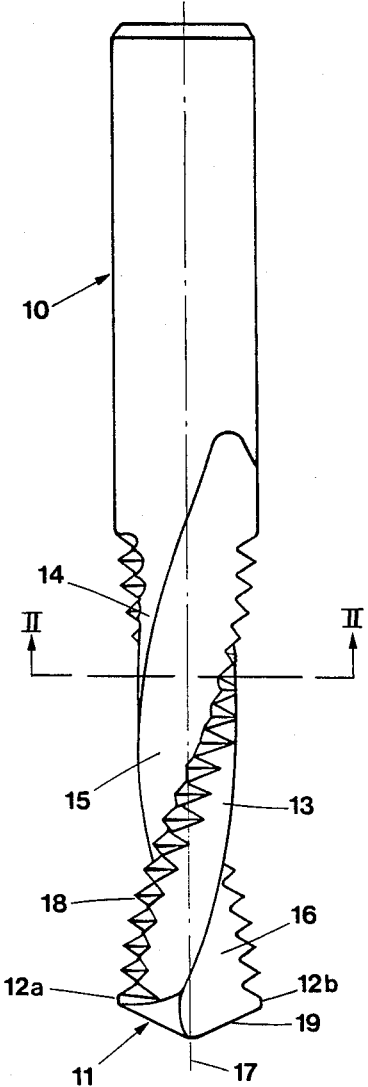
FIG. 1 shows a side view of a drilling and threading tool according to the invention.
Figure 2:
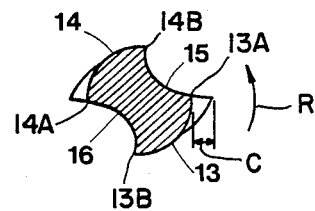
FIG. 2 shows a section along the line II—II in FIG. 1.
Figure 3:
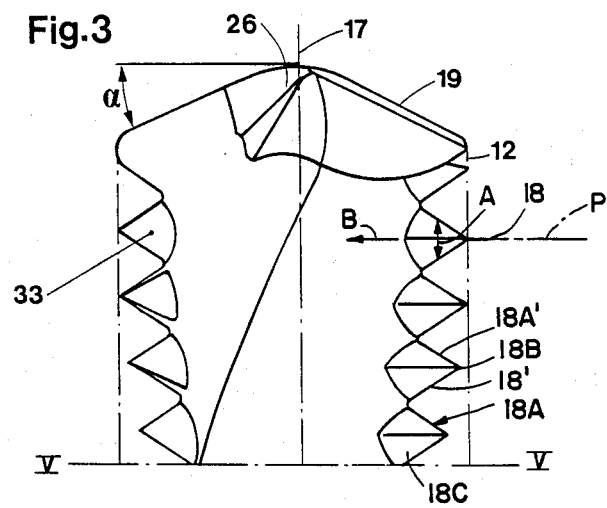
FIG. 3 shows a partially enlarged side view of the tool in FIG. 1.

The tool shown in FIGS. 1-3 includes an elongated cylindrical shank 10 of hard metal, steel or speed steel, whose front end is formed by a conical front portion 11, which transfers into cylindrical guiding surfaces 12a and 12b having a small axial extension, usually less than 1 mm. The part of the drill shank 10 which is close behind the guiding surfaces 12a and 12b is formed by two spirally twisted ribs 13 and 14 between which likewise twisted grooves 1 5, 16 are formed for chip conveyance. The ribs 13, 14 are twisted at an angle about 0° to 40° relative to the center axis 17 of the tool, preferably 25° to 35°. When the angle is 0° the ribs are straight and parallel with the center axis.

Figure 4:
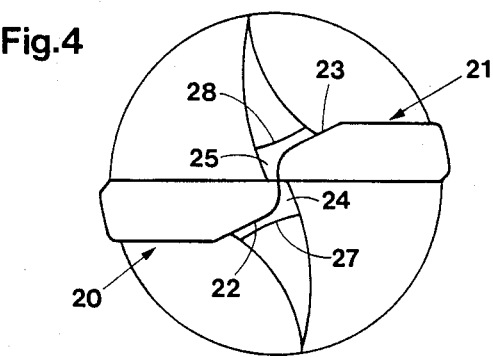
FIG. 4 shows an end view of the tool in FIG. 3.
Figure 5:
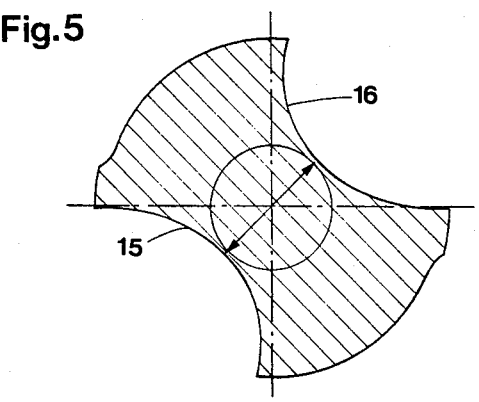
FIG. 5 shows a cross-section along the line V—V in FIG. 3.

As can be seen in FIGS. 1 and 4 the tool is completely symmetrically shaped relative to the center axis 17.

Each of the twisted ribs 13, 14 is provided with a row of thread shaped teeth 18 without pitch and with mutually identical profiles and spacing D, said toothed ribs extending to the front portion 11. Each tooth includes a cutting edge 18A comprised of edge portions 18A' which converge to form a point 18B. Since, as noted above, the teeth are without pitch, the teeth of each rib are circumferentially aligned with teeth of the other ribs such that the points 18B on circumferentially successive ribs lie within a common plane P disposed perpendicularly to the axis 17. These teeth 18 are disposed along a leading edge 13A or 14A of the respective rib and are shaped such that they occupy a small part of the envelope- surface of the rib 13, 14, seen in the circumferential direction. That is, each tooth terminates at a location intermediate the leading edge 13A (or 14A) and trailing edge 13B (or 14B) of the associated rib. This has been found important in order to achieve a good chip flow without problems in the hole which is to be machined in a work piece. The teeth 18 adapted for threading are cut straight in the circumferential direction regarding the row of teeth but they have clearances in the radial and the axial directions, while the rest of the envelope surfaces of the ribs 13, 14 have smooth cylindrically rounded contours. As will be appreciated from FIG. 3, the axial clearance results from the fact that the axial dimension A of each tooth in a direction parallel to the axis 17 decreases in size away from a thread-cutting edge 18A of the tooth, i.e., the dimension A decreases in size in a direction B opposite the direction of rotation R. Thus, there is provided an axial clearance between the side surface 18B of each tooth relative to the thread being cut. As will be appreciated from FIG. 2, the radial clearance results from the fact that the radial dimension C of each tooth in a radial direction of the shank decreases in size in a direction away from the direction of rotation. The circumferential extension of each tooth is at least half the axial extension of the tooth and maximum twice as large. Preferably these extensions are equal. When the tool is rotated around it axis the tips of the teeth lying in the same plane normal to the center axis of the tool describe a circular path. All said paths form a cylinder. Alternatively the paths may form a cone whose apex is directed towards the shank such that during machining the thread will become cylindrical although the tool may be elastically bent. The cone angle is maximum 1°. Thus the diameter of the circular path described by the teeth closest to the front portion 11 is larger than the diameters of the paths described by axially rearwardly positioned teeth.

The tool may be provided with one or more axially oriented fluid passages (not shown), which are symmetrically shaped in both of the ribs and terminate in the front cone surface 19 at each side of the center line 17.

As mentioned above the transition between the front portion or the drill tip 11 and the axially rearwardly extending tool part is formed by cylindrical guiding surfaces 12a and 12b, while the front surface 19 of the drill tip has a conical basic shape. In some applications though the cylindrical surfaces 12a and 12b may be replaced by a fully shaped profile which is equal to the other teeth 18 in all respects.

In the front surface 19 of the tool hole-cutting edge portions 20 and 21 are formed, each of which forms a cutting angle $\alpha$ relative to a normal to the center line 17. The cutting edges 22 and 23 meet in the center of the tool. The cutting edges 22 and 23 are shaped such that the radially inner cutting edge portions are curved, thus forming a mainly S-shaped contour while the radially outer cutting edge portions have a mainly straight contour. The outer edge portion may have a mainly straight contour or be broken at an angle according to FIG. 4. According to a preferred embodiment the curvature of the inner cutting edge portions are larger adjacent to the center line 17 of the tool than further away from it. Furthermore, at the radially inner cutting edge portions there are provided special recesses 24 and 25 at each side of the center line 17 in order to create clearance surfaces at the starting points of the cutting edges 22 and 23 at the center of the tool. These recesses 24, 25 are formed by removing material in the front parts of the twisted passages 15, 16 such that an enlarged clearance surface 26 is created in connection with each cutting edge and adjacent to or in the center of the tool. This clearance surface is preferably provided with a clearance angle which is approximately 0 degrees. The border portion 27, 28 which is created thereby between these recesses 24, 15 and the bottom portions of the twisted chip flutes 15, 16 may serve as chip guides.

The profile of the chip flutes 15, 16 may be varied seen in a cross-section perpendicular to the center line 17 together with the cutting angle $\alpha$, wherein the radially outer portions of the cutting edges may be given a more or less positive or negative basic shape. The geometry of the chip flute determines the cutting geometry of the thread tooth. Thus it is possible to optimize the cutting process as desired.

Furthermore, it may be advantageous in some applications to shape the chip surface of each cutting tooth 18 with a recess such that a better cutting geometry for threading is achieved; this is to additionally alter the cutting geometry which has been achieved by the twisted contour and the geometry of the chip flutes 15, 16.

Figure 6A:
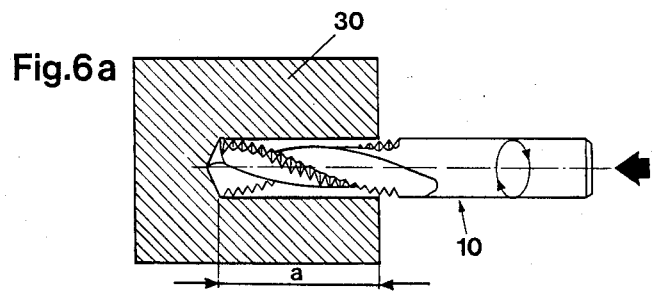
Figure 6B:
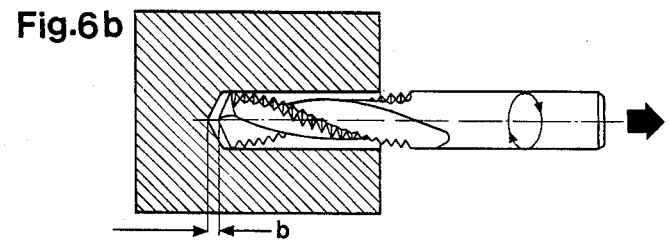
Figure 6C:
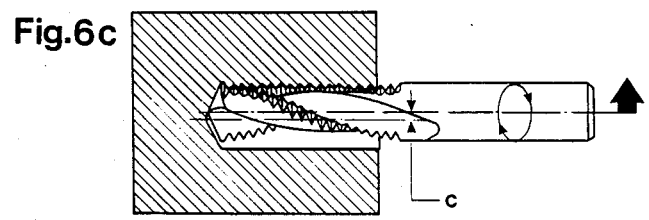
Figure 6D:
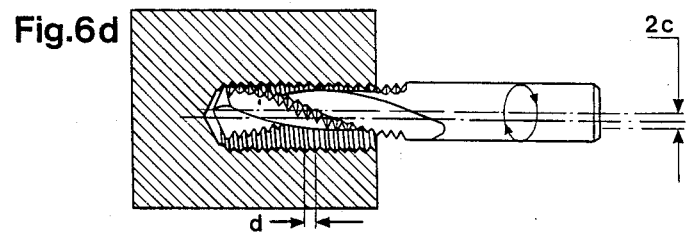
Figure 6E:
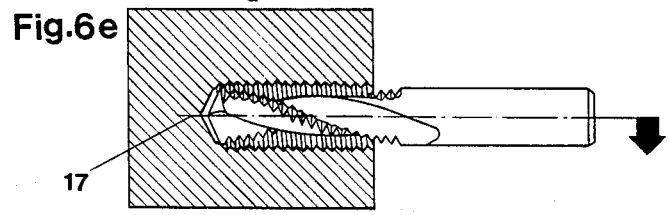
Figure 6F:
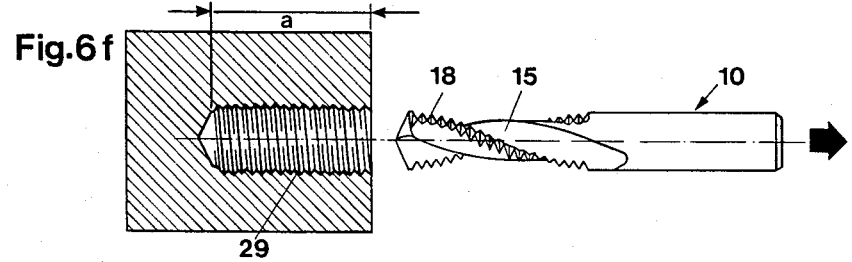

The function and mode of operation of the tool according to the invention are more closely described in connection with FIGS. 6 a–f. It is assumed that a threaded hole 24 shall be provided in a work piece 30 by means of the tool. In a first operation a hole is drilled by means of the tool until a desired depth a is reached, as shown in FIG. 6a. The tool is thereafter retracted a small distance b rearwardly according to FIG. 6b, said distance b preferably fulfilling the condition $b > \tan \alpha$. In the next sequence the tool is laterally displaced a distance c corresponding to a full or a part of the thread profile depth according to FIG. 6c, whereafter the tool is rotated having its teeth 18 actively engaging the inner wall of the drilled hole 28 or preferably simultaneously rotating about its own tool axis 17. Simultaneous with these relative movements the tool is also axially fed such that the threading operation is completed while having the teeth in engagement around the whole circumference during spiral feed of one complete orbit, this has been repeated until the distance c corresponds to the complete thread profile depth according to FIG. 6d. The axial feed during an orbit shall be equal to the distance d, which corresponds to the thread pitch. Then the tool is allowed to return to the center of the hole, FIG. 6e, and is retracted, FIG. 6f. More particularly the method for drilling and threading includes the steps of providing a tool having an elongated shank, a conical front portion which is provided with cutting edges and having ribs positioned therebetween which are provided with cutting teeth projecting radially beyond said ribs but terminating radially equal to or short of the radially outermost parts of said cutting edges, inserting said tool into a machine being able to conduct rotation of the tool, circular interpolation and simultaneous pitch feed, rotating and axially feeding said tool towards and into a work piece thereby forming a hole, having a center line, by the use of said cutting edges, retracting said tool a first distance, offsetting the center axis of said tool a second distance relative to the center line of said hole, rotating said tool and conducting circular interpolation of said tool one turn around the center line of said hole having cutting teeth in engagement with said hole and moving said tool one pitch axially forwardly or rearwardly, allowing said tool to become coaxial with said hole and retracting said tool from said work piece.

The rotary speed of the tool during drilling of the hole may be equal to or different from the rotary speed of the tool during threading.

Such a combination of circular feed (the circumference of the thread) and axial feed (the pitch of the thread) is easily done in the machines available and which offer the possibility of a combination of circular interpolation with simultaneous axial pitch feed, i e one turn around and one pitch movement. It should be understood that it is possible to cut both an internal and an external screw thread on a work piece by means of the present tool.

In the case shown in FIG. 6a–6f it is assumed that the work piece 30 is stationary while only the tool is made to rotate. However, it is possible to allow also the work piece to rotate and/or to be circularly fed relative to the tool and displace the tool and the work piece axially relative to each other a distance which is equal to the pitch of the thread during a turn.

According to an alternative embodiment, more closely shown in FIGS. 7 a–d, the tool according to the invention may be provided with obliquely oriented bevel edges 31a and 31b, which are symmetrically positioned on each side of the axis 17 and axially rearwardly of the tool part that is provided with thread teeth 18. The bevel edges 31a and 31b connect to the tool shank 32 positioned rearwardly thereof. The bevel edges 31a and 31b should be obliquely oriented at an angle !1 relative to the center axis 17, which is 30°–60√, preferably 45°. During holemaking in a work piece 30 by means of this tool the hole 29 is first drilled through.

Figure 7A:
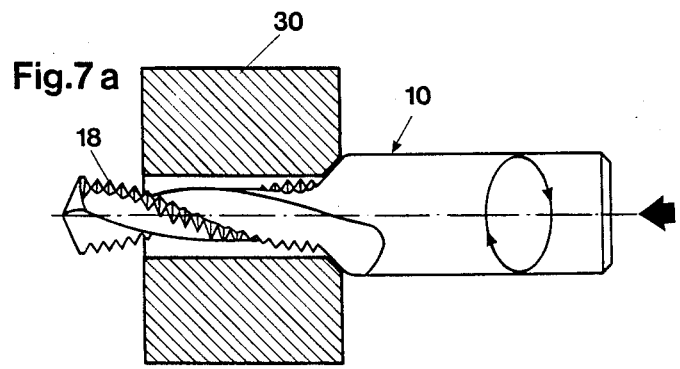
Figure 7B:
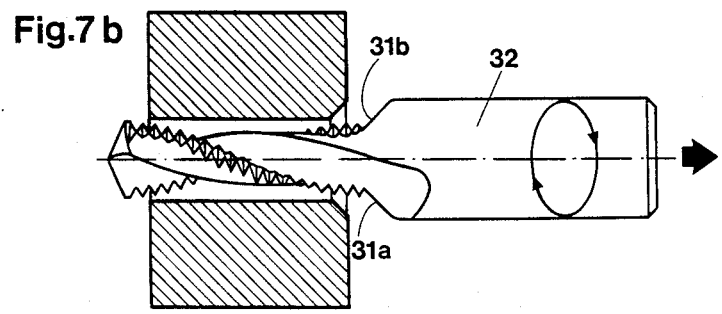
Figure 7C:
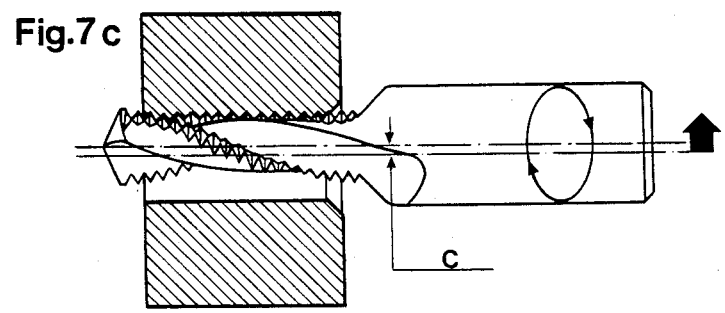
Figure 7D:
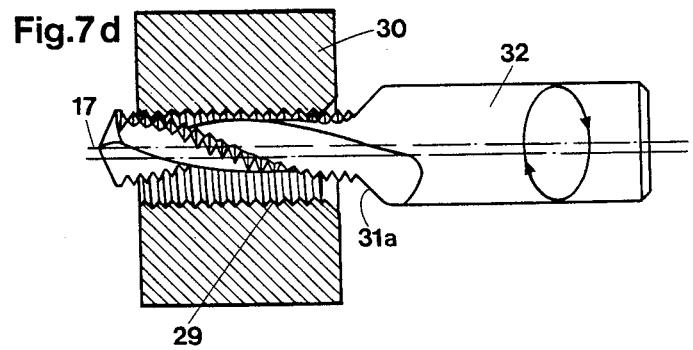

The tool is thereafter forwardly fed an additional distance such that the bevel edges 31a and 31b can engage the entrance side of the work piece and in direct connection with termination of the drilling operation said edges conducting chamfering of the rim of the hole, see FIG. 7a. The tool is retracted axially thereafter a distance, see FIG. 7b, such that the bevel edge runs free from the hole 29, whereafter the tool is displaced laterally a distance C, which corresponds to the whole or parts of the desired thread profile depth according to FIG. 7c, whereafter the tool is rotated having its teeth 18 in active engagement with the inner wall of the drilled hole 29 or simultaneously rotating around its own tool axis 17. Simultaneous with these relative movements the tool is however axially, fed such that the threading operation is completed while having the teeth in engagement around the whole circumference during a complete spiral feed of a turn, this has been repeated until the distance c corresponds to the complete thread profile depth according to FIG. 7d. The pitch during the axial feed shall during a turn be equal to the distance d which corresponds to the thread pitch. The tool is then centered in the hole and retracted.

The tool according to the invention may be produced from tool steel, hard metal or speed steel or combinations thereof. In the case of the tool body being made of tool steel the front drill tip and the cutting edges of the tooth profile should be configured on hard metal wafers which are brazed or clamped to the tool body. According to an alternative embodiment the tool may be manufactured from a compound body consisting of peripheral material portions and core portion.

For example the peripheral material portions may be made of a material which includes hard substances in a substrate of speed steel while the core portions are made of a tougher material, preferably tool steel or speed steel. With such division of materials it is possible to machine the material and grind the necessary sharp cutting edges for the drilling and threading tool.

By means of the above mentioned tool it is thus possible to conduct three different machinery operations; drilling, chamfering and threading without having to exchange the tool in the machine spindle (not shown) where it is inserted. Important down time periods can thereby be eliminated for the benefit of a more cost reducing machining compared with previously known tools.

We claim:

1. A combined drilling and threading tool comprising a shank having a forward end defined by a conical front portion which includes a plurality of hole-cutting edges, said hole-cutting edges extending symmetrically from adjacent a central front-to-rear extending axis of rotation of said shank, said shank including clearance surface means extending rearwardly of radially inner portions of said cutting edges, a plurality of ribs disposed rearwardly of respective ones of said hole-cutting edges, said ribs being spirally curved in said front-to-rear direction and extending symmetrically relative to said axis, said ribs being spaced apart by chip flutes extending symmetrically relative to said axis, each rib including leading and trailing edges with respect to a direction of rotation of said tool, a plurality of thread-cutting teeth spaced along each of said ribs in said front-to-rear direction, said teeth on each rib being spaced apart by equal distances in said front-to-rear direction, each of said teeth including a thread-cutting edge disposed at said leading edge of its associated rib and side surface means extending from said thread-cutting edge in a direction opposite said direction of rotation, each of said cutting edges including edge portions converging toward a point, said teeth of each rib being circumferentially aligned with associated teeth of the other ribs such that said points on circumferentially successive ribs lie substantially within a common plane disposed perpendicularly to said axis, each said tooth having an axial dimension in a direction parallel to said axis, said axial dimension decreasing in size away from said direction of rotation, each of said teeth having a radial dimension extending radially relative to said axis, said radial dimension decreasing in size away from said direction of rotation, each of said teeth terminating at a location intermediate said leading and trailing edges of its associated rib.

2. A tool according to claim 1, wherein said shank includes cylindrical guiding surfaces defining a transition between said conical front portion and said ribs, said cylindrical surfaces having a radius at least equal to a radius of each of said hole-cutting edges.

3. A tool according to claim 1, wherein said shank includes internal front-to-rear extending passage means for conducting fluid towards a front end of said shank.

4. A tool according to claim 1, wherein said hole-cutting edges include radially inner portions which are symmetrically curved toward said axis, and substantially straight radially outer portions.

5. A tool according to claim 4, wherein said clearance surface means has a clearance angle of substantially zero degrees.

6. A tool according to claim 5, wherein each hole-cutting edge has an increasing degree of curvature toward said axis.

7. A tool according to claim I, wherein each of said ribs forms an angle up to 40 degrees with said axis 8. A tool according to claim 7, wherein said angle is from 25 to 35 degrees.

9. A tool according to claim 1, wherein said shank includes chamfer-cutting edges obliquely oriented relative to said axis and symmetrically oriented on opposite sides of said axis, said chamfer edges disposed immediately rearwardly of said teeth to chamfer a hole but by said tool.

10. A tool according to claim 9, wherein each of said chamfer edges forms an angle of 30 to 60 degrees relative to said axis.

11. A tool according to claim 10, wherein said angle is 45 degrees.

12. A tool according to claim 1, wherein said hole-cutting edges meet at said axis to form a point and extend rearwardly therefrom.

* * * * *